United States Patent
Towner

(10) Patent No.: US 9,638,424 B2
(45) Date of Patent: May 2, 2017

(54) ELONGATED GRIPPING DEVICE

(71) Applicant: Joseph Towner, Portland, MI (US)

(72) Inventor: Joseph Towner, Portland, MI (US)

( * ) Notice: Subject to any disclaimer, the term of this patent is extended or adjusted under 35 U.S.C. 154(b) by 0 days.

(21) Appl. No.: 14/560,249

(22) Filed: Dec. 4, 2014

(65) Prior Publication Data

US 2016/0010870 A1    Jan. 14, 2016

Related U.S. Application Data

(60) Provisional application No. 62/021,743, filed on Jul. 8, 2014.

(51) Int. Cl.
*F24B 15/10*    (2006.01)
*B25J 1/04*    (2006.01)

(52) U.S. Cl.
CPC ................ *F24B 15/10* (2013.01); *B25J 1/04* (2013.01)

(58) Field of Classification Search
CPC .................................... F24B 15/10; B25J 1/04
USPC .................. 294/11, 28, 30, 104, 103.1, 106; 119/806; D8/51
See application file for complete search history.

(56) References Cited

U.S. PATENT DOCUMENTS

| | | | | |
|---|---|---|---|---|
| 741,816 A | * | 10/1903 | McKinniss | F24B 15/10 294/104 |
| 776,591 A | * | 12/1904 | Hower | F24B 15/10 294/11 |
| 1,021,290 A | * | 3/1912 | Althouse | F24B 15/10 294/11 |
| 1,284,323 A | * | 11/1918 | Hansen | F24B 15/10 294/11 |
| 1,934,801 A | * | 11/1933 | Hiner | A01K 15/003 119/806 |
| 2,135,232 A | * | 11/1938 | Dawn | A63B 47/02 294/11 |
| 2,587,383 A | * | 2/1952 | Reents | A01K 15/003 119/806 |
| 2,591,499 A | * | 4/1952 | Bible | B25B 9/00 294/11 |
| 3,171,386 A | * | 3/1965 | De Ronde | A01K 15/003 294/104 |
| 4,105,238 A | | 8/1978 | Stright | |
| 4,449,743 A | | 5/1984 | Pankratz | |
| 4,478,449 A | | 10/1984 | Bernier | |
| 5,253,408 A | * | 10/1993 | Wright | B25B 7/00 294/11 |

(Continued)

*Primary Examiner* — Paul T Chin
(74) *Attorney, Agent, or Firm* — Global Intellectual Property Agency, LLC; Daniel Boudwin

(57) ABSTRACT

An elongated gripping device for grasping objects, and particularly useful for moving and adjusting logs used to build a fire. The elongated gripping device includes an elongated outer shaft having an extension shaft on an end thereof. The extension shaft includes one or more prongs on an end thereof, disposed transversely to the extension shaft. The elongated gripping device further includes an elongated inner shaft extending through the outer shaft, and having a handle at a first end thereof. The inner shaft further includes one or more prongs on the second end thereof that are arranged transversely to the inner shaft. The prongs on the inner shaft and on the extension shaft oppose one another so as to form a claw-like structure that can be used to grasp objects of various shapes and sizes by rotating the handle to actuate the prongs.

6 Claims, 2 Drawing Sheets

(56) References Cited

U.S. PATENT DOCUMENTS

| | | | |
|---|---|---|---|
| 5,603,543 A * | 2/1997 | Ratte | F24B 15/00 294/11 |
| 5,941,587 A | 8/1999 | Wolff et al. | |
| 6,457,756 B2 | 10/2002 | Pronesky et al. | |
| D558,547 S * | 1/2008 | Gildemeister | D8/51 |
| D739,694 S * | 9/2015 | Epting | D8/14 |

* cited by examiner

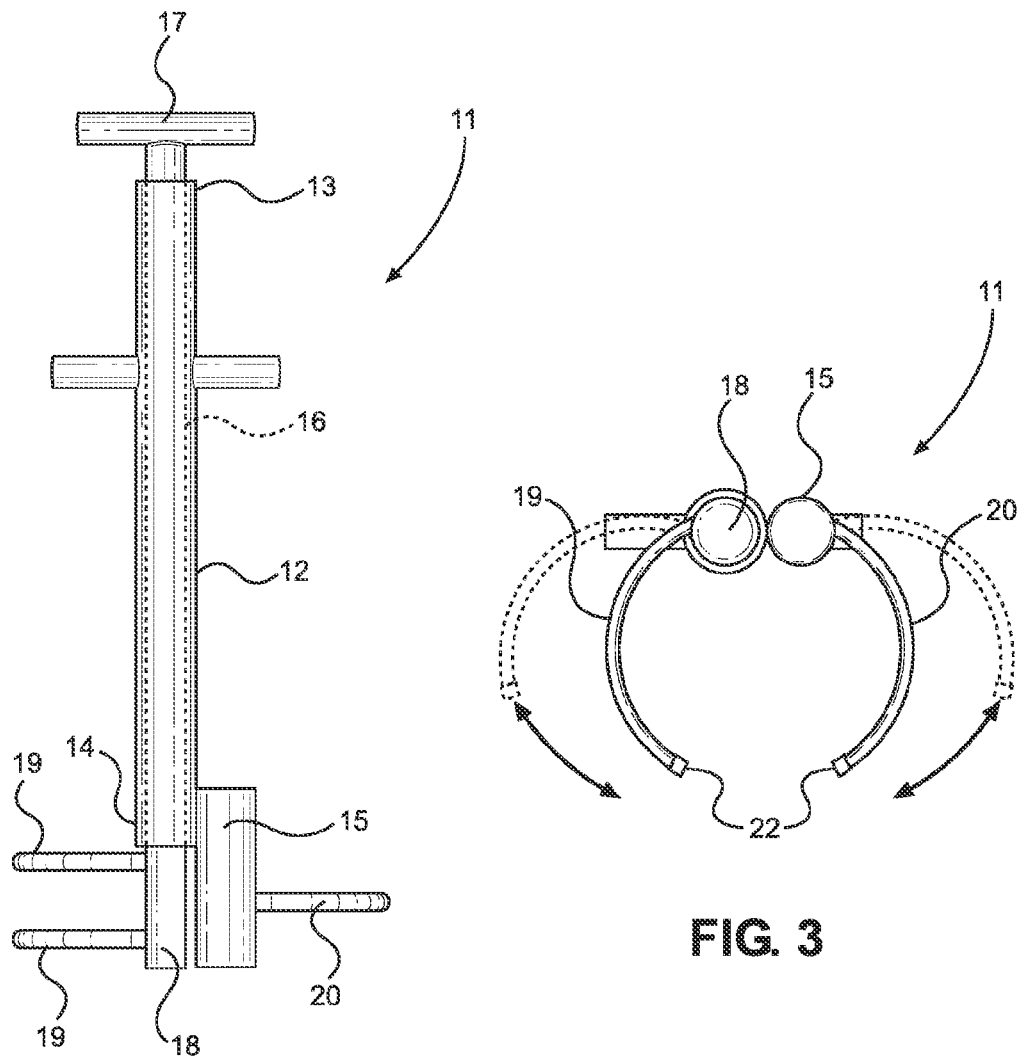

ELONGATED GRIPPING DEVICE

CROSS REFERENCE TO RELATED APPLICATION

This application claims the benefit of U.S. Provisional Application No. 62/021,743 filed on Jul. 8, 2014. The above identified patent application is herein incorporated by reference in its entirety to provide continuity of disclosure.

BACKGROUND OF THE INVENTION

Field of the Invention

The present invention relates to an elongated gripping device. More specifically, the present invention provides a gripping device for moving pieces of wood within a fire. The present invention includes an elongated shaft having opposing prongs on an end thereof that be actuated by means a rotatable handle on the opposite end of the elongated shaft, so that the prongs can be used to grasp and lift various objects.

When building and sustaining a fire, it is often necessary to adjust the burning pieces of wood within the fire. Wood is consumed as the fire burns, and the remaining pieces of wood may shift within the fire. If the fire is not constructed properly, the fire may burn unevenly and may need to be restarted. Alternatively, if a fire is not constructed properly, the fire may produce a substantial amount of smoke. Thus, it is important for users to periodically adjust the fire or add new logs to the fire in order to maintain the fire.

However, it is dangerous to come too close to the fire when attempting to move burning pieces of wood. Further, the wood itself becomes extremely hot and can cause severe burns if the person is not careful moving the pieces of wood. People often use various tools such as pokers, fire irons, and other similar items to move pieces of wood and to rake the embers within a fire. These devices do not allow a user to easily and accurately grasp various pieces of wood within the fire, and simply allow a user to break apart burning pieces or shift the pieces of wood. Thus, a device that allows a user to easily grasp and move logs and other objects from a safe distance is desired.

Description of the Prior Art

Devices have been disclosed in the prior art that relate to elongated gripping devices. These include devices that have been patented and published in patent application publications. These devices generally relate to gripping devices having claws or a jaw for use with fires or fireplaces. The following is a list of devices deemed most relevant to the present disclosure, which are herein described for the purposes of highlighting and differentiating the unique aspects of the present invention, and further highlighting the drawbacks existing in the prior art.

One such device, U.S. Pat. No. 4,449,743 to Pankratz discloses a log handling tool with an elongated barrel and a shaft movable within the barrel. The shaft includes a spring tine member on the outer ends thereof, and the barrel includes prong members thereon for cooperating with the spring tine member. The device includes a trigger for actuation of the device so that a user can use the prong members and spring tine to grasp a log or other object. Thus, Pankratz discloses a device for grasping logs, but fails to disclose a device having an outer shaft with one or more prongs, and inner shaft with one or more prongs, wherein the user can actuate the device by rotating a handle thereon.

U.S. Pat. No. 4,105,238 to Stright discloses an article handling implement for carrying logs. The device includes inner jaws pivotally connected to a handle. An outer jaw opposes the inner jaws and is pivotally connected between the inner jaws. The device further includes an actuating lever connected to an end of the handle and a wire connecting the actuating lever to the jaws, for use in opening and closing the jaws. Thus, Stright fails to disclose a device having an outer shaft with prongs thereon and an inner shaft with prongs thereon, wherein the prongs can be used to grasp an object by rotating a handle on an end of the device.

U.S. Pat. No. 4,478,449 to Bernier discloses fireplace tongs having a pair of levers connected to one another at a pivot point. The device includes a first jaw and a second jaw. A connecting link is pivotally mounted on the jaws, such that closing the levers causes the jaws to tighten. Thus, Bernier discloses fireplace tongs and fails to disclose a device having an inner and outer shaft each having prongs thereon for grasping a log or other object.

U.S. Pat. No. 5,941,587 to Wolff et al. discloses a grasping device having an elongated body. The elongated body includes a first end having a cammed lever for pulling a wire. The wire extends through a first jaw and attaches to a second jaw. The jaws are connected by a pin that allows sliding motion in response to a user pulling the wire. Thus, Wolff et al. does not disclose an elongated gripping device for grasping logs within a fire that includes an inner shaft disposed within an outer shaft.

Finally, U.S. Pat. No. 6,457,756 to Pronesky et al. discloses a device for handling wood and burning materials. The device utilizes a sliding/pivoting joint for causing the rotational grabbing motion of a jaw. The device includes an elongated member having a handle on an end thereof and a movable jaw on the opposing end thereof. Thus, while Pronesky et al. discloses a grasping device, Pronesky does not disclose a device having an inner and outer shaft with prongs thereon, wherein the prongs are movable by rotating the handle thereof.

These prior art devices have several known drawbacks. The devices in the prior art generally relate to grasping devices for holding logs and other objects. However, these devices fail to disclose a device having an inner shaft positioned within an outer shaft, wherein the inner shaft can rotate therein. This arrangement saves space and conceals the moving portions of the device. Further, the present invention provides a wide range of motion and allows a user to fully control the motion of the jaw thereon. Other such devices provide only a trigger mechanism for opening and closing the jaws, limiting the degree to which the jaws can be opened.

In light of the devices disclosed in the prior art, it is submitted that the present invention substantially diverges in design elements from the prior art and consequently it is clear that there is a need in the art for an improvement to existing elongated gripping devices. In this regard the instant invention substantially fulfills these needs.

SUMMARY OF THE INVENTION

In view of the foregoing disadvantages inherent in the known types of gripping devices now present in the prior art, the present invention provides a new elongated gripping device wherein the same can be utilized for providing convenience for the user when moving logs or embers within a fire or fireplace.

It is therefore an object of the present invention to provide a new and improved elongated gripping device that has all of the advantages of the prior art and none of the disadvantages.

It is another object of the present invention to provide an elongated gripping device that is operated by means of a rotatable handle on the gripping device.

Another object of the present invention is to provide an elongated gripping device that allows a user to grasp and move logs and objects of various shape and size.

Yet another object of the present invention is to provide an elongated gripping device comprising opposing prongs for grasping an object therebetween.

Another object of the present invention is to provide an elongated gripping device that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 2 shows a top-down view of the gripping tool of the present invention.

FIG. 3 shows a front view of the gripping tool of the present invention.

DETAILED DESCRIPTION OF THE INVENTION

Figure 1:
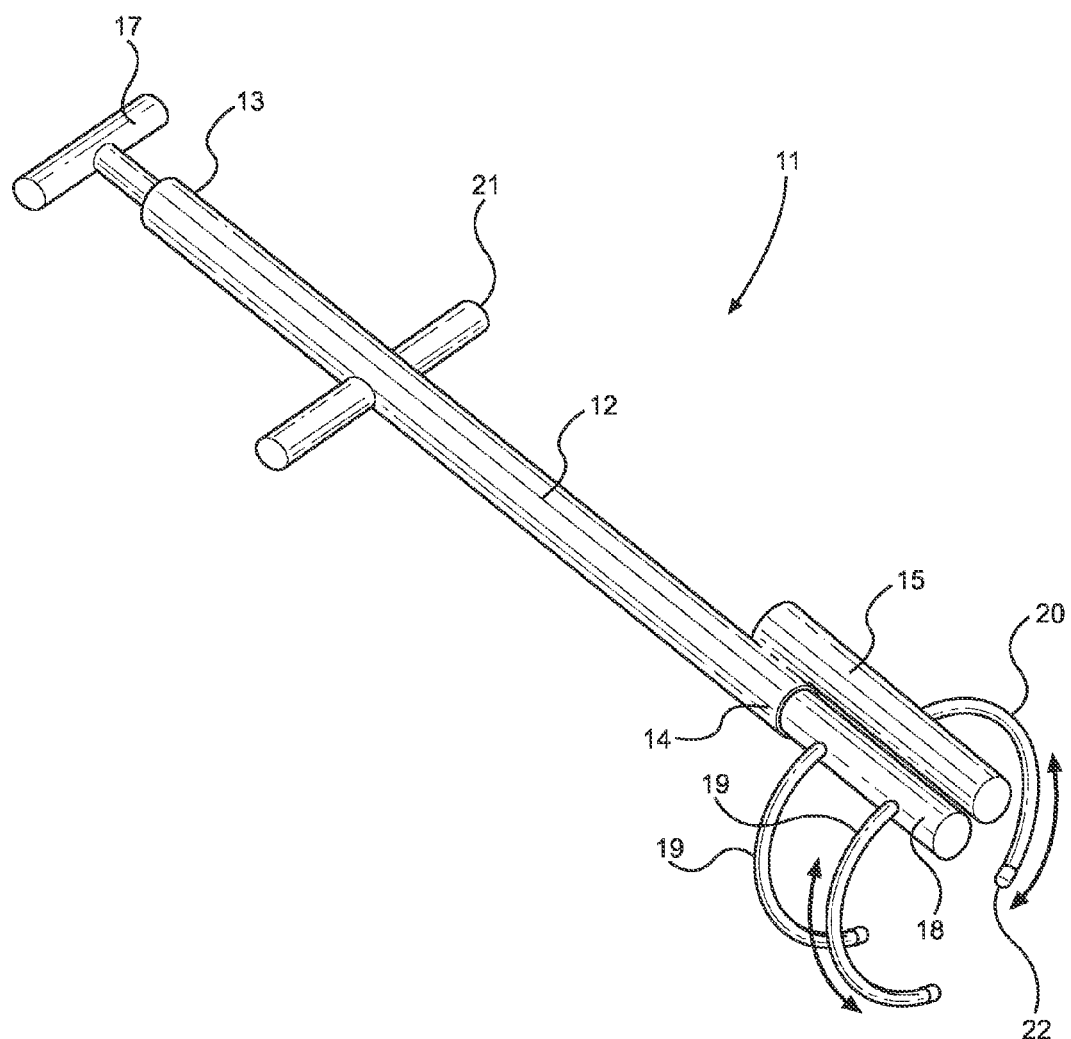
FIG. 1 shows a perspective view of the gripping tool of the present invention.

Reference is made herein to the attached drawings. Like reference numerals are used throughout the drawings to depict like or similar elements of the elongated gripping device of the present invention. For the purposes of presenting a brief and clear description of the present invention, the preferred embodiment will be discussed as used for grasping objects, such as logs within a fire, for the purpose of lifting or transporting the objects. The figures are intended for representative purposes only and should not be considered to be limiting in any respect.

Referring now to FIG. 1, there is shown a perspective view of the gripping tool of the present invention. The present invention provides a gripping tool 11 having an elongated outer shaft 12 with a hollow interior volume, a first end 13, and a second end 14. The outer shaft 12 is substantially linear and is preferably cylindrical. The outer shaft 12 is preferably composed of a strong, durable material that will not be damaged by exposure to a fire or extreme heat, such as a metal. The outer shaft 12 includes a support handle 21 thereon that a user can hold in order to facilitate operation and manipulation of the gripping device 11. The support handle 21 may include insulating padding or cushioning thereon to prevent transfer of heat from the outer shaft 12 to the user's hand.

The first and second ends 13, 14 of the gripping device 11 are open, and the second end 14 further includes an extension shaft 15 permanently and pivotally attached on a side thereof that extends parallel to the elongated shaft 12. The extension shaft 15 includes one or more prongs 20 thereon that are adapted to engage an object desired to be picked up or lifted. The prongs 20 are perpendicular to the extension shaft 15 and extend downward therefrom. The prongs 20 include a tip 22 on an end thereof that includes a high-friction material to facilitate grasping an object. Additionally, the tips 22 help prevent the prongs 20 from piercing through an object.

An inner shaft extends through the outer shaft 12 and is rotatable therein. The inner shaft includes a handle 17 on a first end thereof that extends outward from the first end 13 of the outer shaft 12. The second end 18 of the inner shaft extends outward from the second end 14 of the outer shaft 12 and extends alongside the extension shaft 15. The second end 18 of the inner shaft includes one or more prongs thereon 19 for grasping an object. The prongs 19 are perpendicular to the inner shaft and extend downward therefrom. Preferably, the prongs 19 on the second end of the inner shaft are substantially equal in dimension and shape as the prongs 20 on the extension shaft 15. The prongs 19 also include a tip 22 on an end thereof that includes a high-friction material to facilitate grasping an object. In this way, the prongs 19, 20 can be used together in a claw-like manner.

Referring now to FIG. 2, there is shown a top-down view of the gripping tool of the present invention. The gripping tool 11 includes an outer shaft 12 having a hollow interior and that is open at a first end 13 and second end 14 thereof. An inner shaft 16 comprises a tubular construction and extends through the hollow interior of the outer shaft 12. The first end 17 of the inner shaft 16 extends outward from the first end 13 of the outer shaft 12 and includes a handle 17 thereon. The handle 17 includes a T-shaped member that may include padding or cushioning thereon to provide comfort to the user and to improve the user's grip. The padding may also be insulating so as to minimize heat transfer from the gripping device 11 to the user's hands. The second end 18 of the inner shaft 16 extends outward from the second end 14 of the outer shaft 12. The second end 18 includes one or more prongs 19 thereon that extend perpendicularly from the inner shaft 16.

The second end of the inner shaft 18 and the extension shaft 15 include prongs 19, 20 thereon, forming a claw-like member. The one or more prongs 19 on the inner shaft 16 extend perpendicularly from the inner shaft 16 and are spaced at a fixed interval. Further, the one or more prongs 19 are preferably parallel to one another. Similarly, the one or more prongs 20 on the extension shaft 15 are spaced at a fixed interval and are parallel to one another. Further, the prongs 19 on the inner shaft 16 are preferably staggered in relation to the prongs 20 on the extension shaft, such that when the claw is closed, the prongs 19, 20 are interlaced and do not contact one another. The prongs 19 on the inner shaft 16 oppose the prongs 20 on the extension shaft 15 so that an object can be grasped therebetween.

Referring now to FIG. 3, there is shown a front view of the gripping tool of the present gripping invention. The prongs 19, 20 preferably comprise an arcuate shape, and may be approximately semi-circular in configuration. The tips 22 of the prongs 19 on the inner shaft 16 face towards the tips 22 of the prongs 20 on the extension shaft 15. In this way, an object can be grasped between the opposing prongs 19, 20 so that it can be moved to a desired location. By rotating the inner shaft 16, the prongs 19 thereon can be rotated inward and outward in a vertical plane perpendicular to the longitudinal axis of the inner shaft 16. Similarly, the prongs 20 on the extension shaft 15 can be rotated in a vertical plane perpendicular to the longitudinal axis of the extension shaft 15. In this way, the prongs 19, 20 can be rotated towards one another for grasping an object, and away from one another for releasing an object. The prongs 19, 20 can be operated so as to separate the prongs 19, 20 to a desired extent so that a user can pick up objects of various shapes and sizes. The ends of the prongs 19, 20 comprise tips 22 thereon, such as a rubber tip or a cement tip for helping the device to grasp objects more easily.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A gripping device, comprising:
   an elongated tubular outer shaft having a hollow interior volume, an open first end, and an open second end;
   an elongated tubular inner shaft extending through said interior volume of said outer shaft, said inner shaft having a first end and as second end, said inner shaft rotatable within said outer shaft;
   wherein a first end of said inner shaft extends outward from said open first end of said outer shaft and includes a handle thereon;
   wherein a second end of said inner shaft extends outward from said open second end of said outer shaft and comprises at least one prong thereon, wherein said at least one prong is perpendicular to said inner shaft;
   said second end of said outer shaft having a pivotal extension shaft pivotally secured thereon that is parallel to a longitudinal axis of said inner shaft, said pivotal extension shaft comprising a uniform width and having one prong thereon, wherein said one prong is perpendicular to said pivotal extension shaft;
   wherein the at least one prong on the inner shaft is staggered relative to the one prong on the pivotal extension shaft such that each of the at least one prong on the inner shaft is not aligned with the one prong of the pivotal extension shaft.

2. The gripping device of claim 1, wherein said at least one prong on said inner shaft and said one prong on said pivotal extension shaft comprise an arcuate shape.

3. The gripping device of claim 1, wherein said at least one prong on said inner shaft and said one prong on said pivotal extension shaft comprise rubber tips on the ends thereof.

4. The gripping device of claim 1, wherein said outer shaft comprises a support handle positioned transversely thereon.

5. The gripping device of claim 1, wherein said outer shaft and said inner shaft are cylindrical.

6. The gripping device of claim 1, wherein said at least one prong on said inner shaft oppose said one prong on said extension shaft.

\* \* \* \* \*